Figure 1:
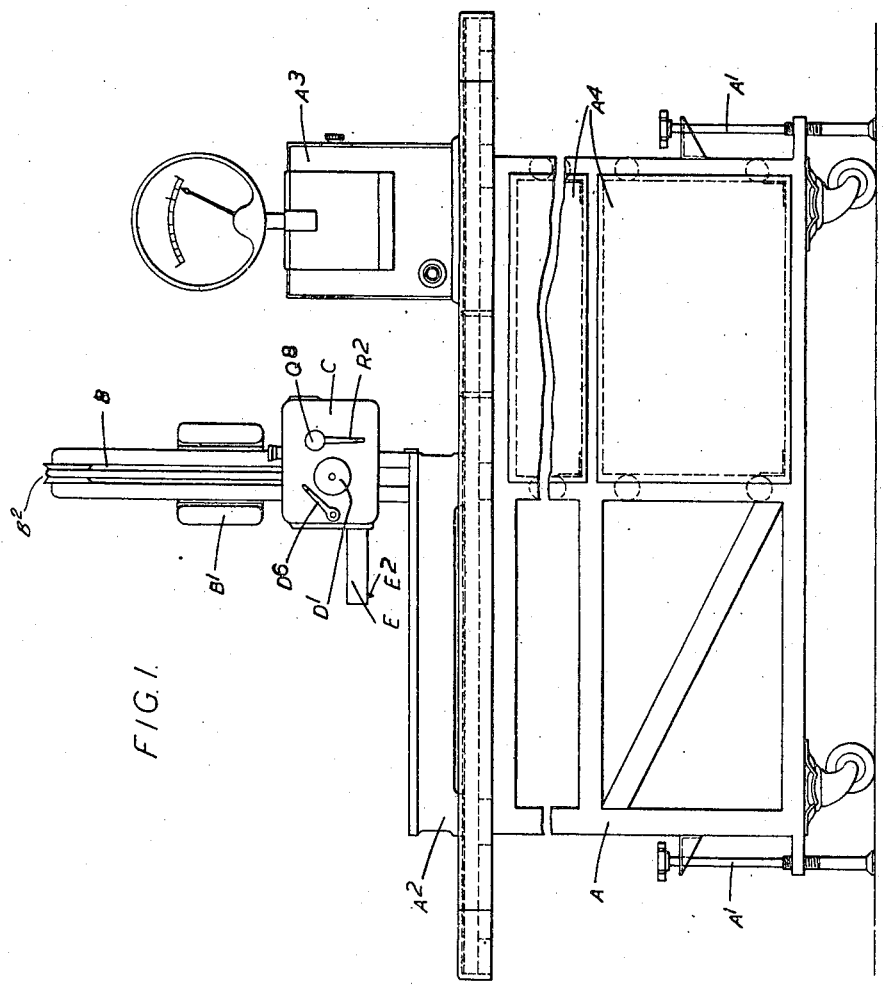

Oct. 4, 1949.  R. E. REASON ET AL  2,483,668
APPARATUS FOR MEASURING OR INDICATING
ROUGHNESS OR UNDULATIONS OF A SURFACE
Filed June 12, 1944  11 Sheets-Sheet 1

Richard Edmund Reason, Inventor

By Emery Holcombe Blair
Attorney

Oct. 4, 1949. R. E. REASON ET AL 2,483,668
APPARATUS FOR MEASURING OR INDICATING
ROUGHNESS OR UNDULATIONS OF A SURFACE
Filed June 12, 1944 11 Sheets-Sheet 2

RICHARD EDMUND REASON Inventor
By Emery Holcombe & Blair
Attorney

Oct. 4, 1949.   R. E. REASON ET AL   2,483,668
APPARATUS FOR MEASURING OR INDICATING
ROUGHNESS OR UNDULATIONS OF A SURFACE
Filed June 12, 1944   11 Sheets-Sheet 4

Inventor
RICHARD EDMUND REASON
By
Emery Holcombe & Clay
Attorney

Oct. 4, 1949.  R. E. REASON ET AL  2,483,668
APPARATUS FOR MEASURING OR INDICATING
ROUGHNESS OR UNDULATIONS OF A SURFACE
Filed June 12, 1944  11 Sheets-Sheet 6

Richard Edmund Reason, Inventor
By Emery Holcombe & Rein
Attorney

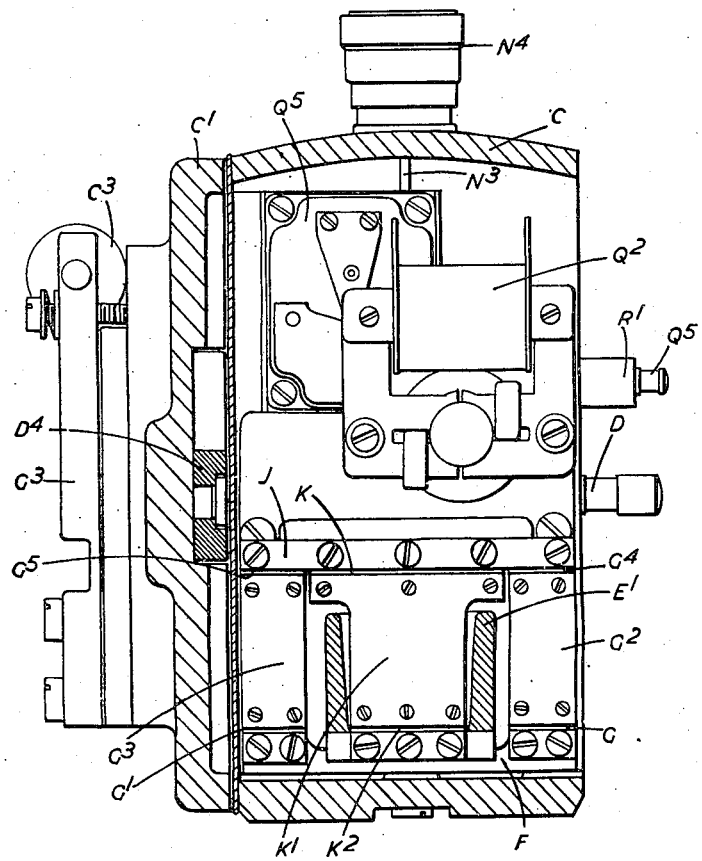

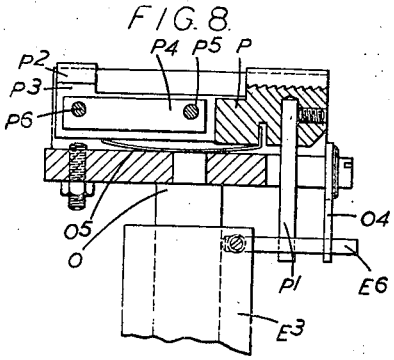
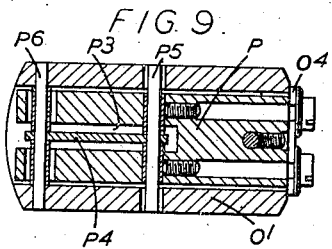
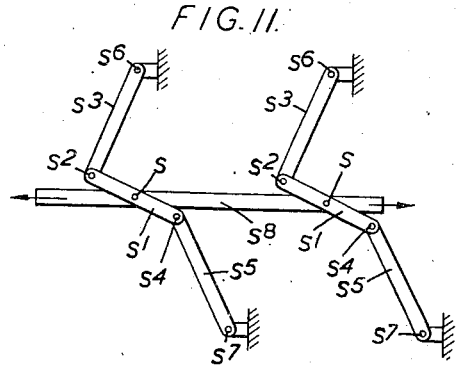
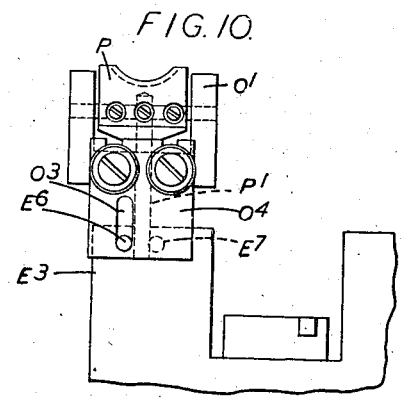
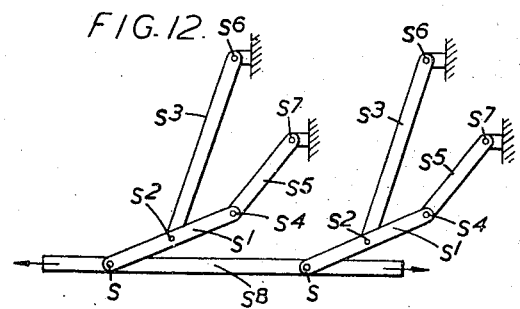
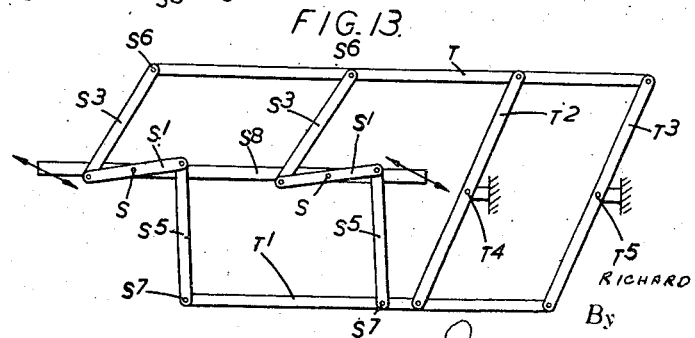

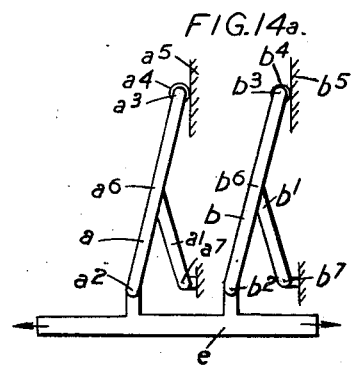
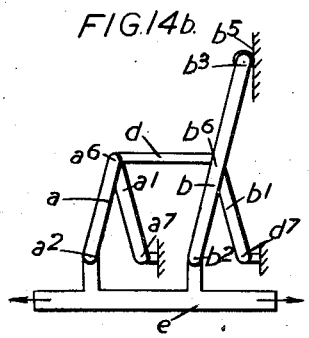
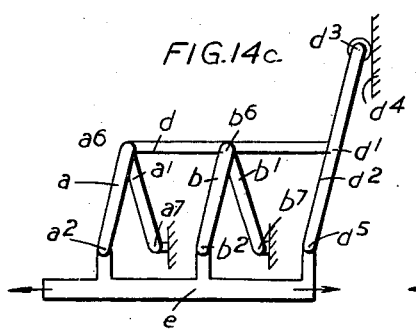
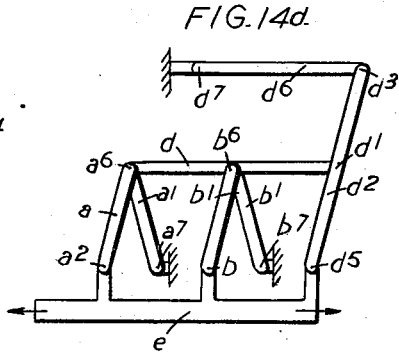
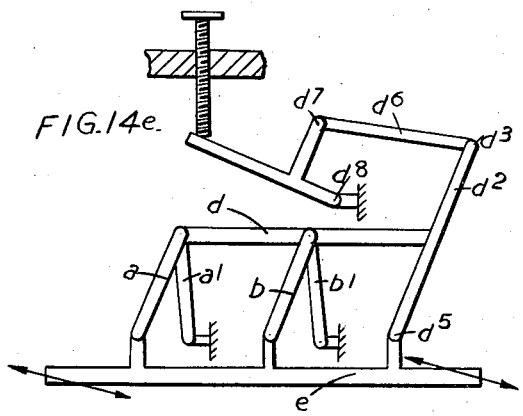

Oct. 4, 1949.    R. E. REASON ET AL    2,483,668
APPARATUS FOR MEASURING OR INDICATING
ROUGHNESS OR UNDULATIONS OF A SURFACE
Filed June 12, 1944    11 Sheets-Sheet 11
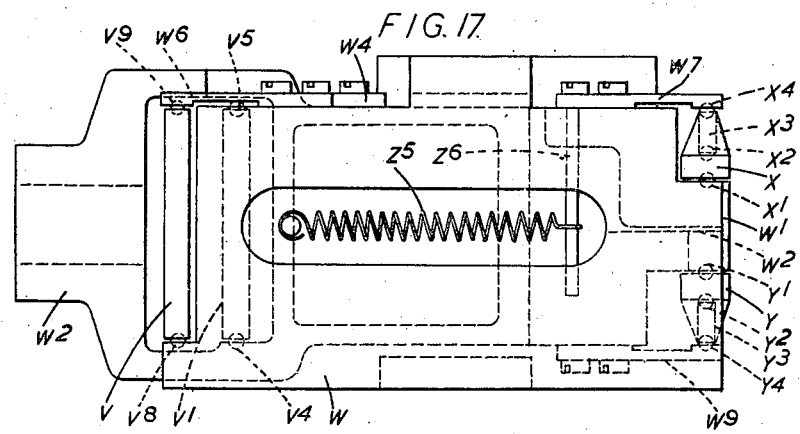
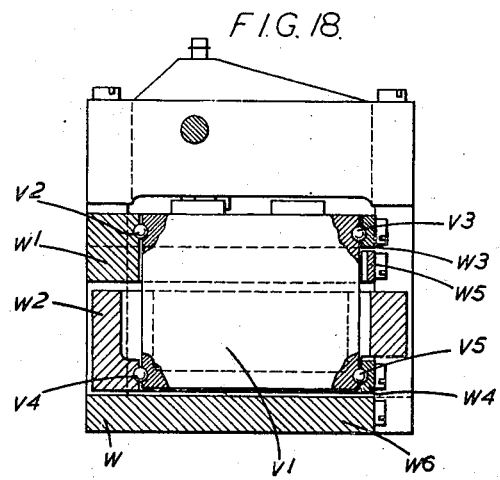
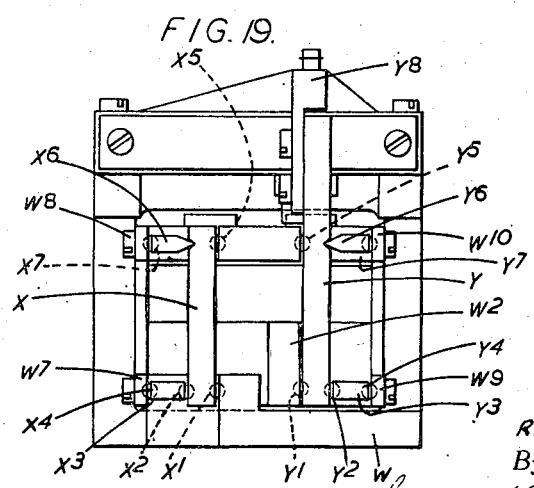
Inventor
RICHARD EDMUND
REASON
By
Emery Holcombe & Blair
Attorney

UNITED STATES PATENT OFFICE 2,483,668

APPARATUS FOR MEASURING OR INDICATING ROUGHNESS OR UNDULATIONS OF A SURFACE

Richard Edmund Reason and Donald Roy Berridge, Leicester, England, assignors to Taylor, Taylor & Hobson Limited, Leicester, England, a company of Great Britain Application June 12, 1944, Serial No. 539,862
In Great Britain March 24, 1943

Section 1, Public Law 690, August 8, 1946
Patent expires March 24, 1963

13 Claims. (Cl. 73—105)

This invention relates to apparatus for measuring or indicating the roughnesses or undulations of a surface, of the kind in which a stylus is traversed over the surface and the movements of the stylus normal or approximately normal to the surface during such traversing are transformed into electrical energy for controlling a measuring or indicating instrument. The invention is especially concerned with a pick-up unit for use in such apparatus.

The present applicants' United States of America patent specification No. 2,329,084 describes one such pick-up unit, comprising a casing or framework which can be located in any chosen position relatively to the surface under investigation, a pick-up head carried thereby, and means for driving the pick-up head over the surface at any one of two or more different speeds, the pick-up head itself consisting of a skid engaging with the surface over an appreciable area, a stylus projecting through the skid to the surface and movable relatively to the skid during traversing, and a differential electromagnetic detector device responsive to such relative movement for controlling the measuring or indicating instrument. This arrangement enables the stylus to be traversed at will either at a relatively slow speed for operating a pen recorder or like instrument or at a relatively high speed for operating an "average" meter to give a measure of the average roughness or waviness of the surface.

In the preferred construction described in such prior specification the pick-up head is carried by a horizontal shaft movable longitudinally in bearings in the walls of the casing near the bottom thereof. This shaft carries a bracket on the top of which is a half-nut engaging with a screw-threaded driving shaft driven through change-speed gearing from an electric motor, the teeth of the screwthread being asymmetrical after the manner of a ratchet to permit the half-nut to travel freely in the reverse direction and thereby facilitate resetting the starting position after a forward traverse has been completed.

The present invention has for its object to provide an improved construction of pick-up unit wherein possible errors in the traversing movement due for example to friction at the bearings of the horizontal shaft are eliminated or minimised. A further object of the invention is to enable the use of a skid on the pick-up head to be avoided.

The pick-up unit according to the invention comprises a casing or framework which can be located in any chosen position relatively to the surface under investigation, a pick-up head carrying a stylus for engaging with the surface, a member carrying the pick-up head, link mechanism within the casing comprising a group of mutually pivoted links constituting in effect two straight-line linkages respectively constraining two points of the said member to perform at least approximately straight-line movements in the same direction, and driving means cooperating with the link mechanism to cause the member and the pick-up head to be traversed over the surface along the straight-line path determined by the link mechanism. With this arrangement, the member will be constrained to make a bodily translational movement in which all parts of the member remain parallel to their original positions, so that the pick-up head may be mounted in any desired position on the member, without the necessity for the use of a skid. The line joining the two constrained points of the member may be coincident with the direction of movement thereof or may be at an angle thereto, and it is especially convenient to provide means whereby such angle may be varied.

It should be made clear that the term "straight-line linkage" is herein used to mean a group of mutually pivoted links so arranged as to be mainly or wholly contributory to the generation of a straight line or a close approximation to a straight line by a point of the linkage such point being known as the "tracing point" of the linkage. Thus the term includes true linkages, wherein two or more points are fixed and the linkage is otherwise unconstrained (except in some instances for stops limiting the range of movement of the tracing point), and also guided linkages in which at least one point of the linkage is constrained to a definite path by a fixed guide.

Amongst the true linkages may be mentioned various alternative constructions (including for example linkages of the Watt type) employing three links, one of which carries the tracing point whilst the other two are pivoted about fixed points and are also pivoted to the first link, the lengths of the three links and the distance between the fixed pivots being appropriately interrelated.

The well-known example of a guided straight-line linkage is the Scott-Russell linkage comprising two links, of which the first is twice the length of the second which is pivoted about a fixed point and also pivoted to the mid-point of the first link, one end of the first link constituting the tracing point whilst the other end is constrained to move along a straight guide collinear with the fixed pivot. The accuracy of the straight line generated by the tracing point in the Scott-Russell linkage depends on the accuracy of the guide, but a very close approximation to a straight line will be obtained in the portion of the trace close to the fixed pivot even with quite material errors in the guide. It will be clear, therefore, that this portion of the trace will still approximate closely to a straight line, if the other end of the first link is moved on a circular path of large radius instead of along a straight guide, and the linkage can be converted into a true linkage giving an approximate straight line by the use of a third link pivoted about a fixed point at its remote end to provide such a circular path.

The invention may be carried into practice in various ways, but the accompanying drawings illustrate a preferred construction of pick-up unit according to the invention, together with some modifications thereof, such preferred construction (as also some of the modifications) incorporating also the invention of the copending application Serial No. 536,634, filed May 20, 1944, now abandoned.

Figure 2:
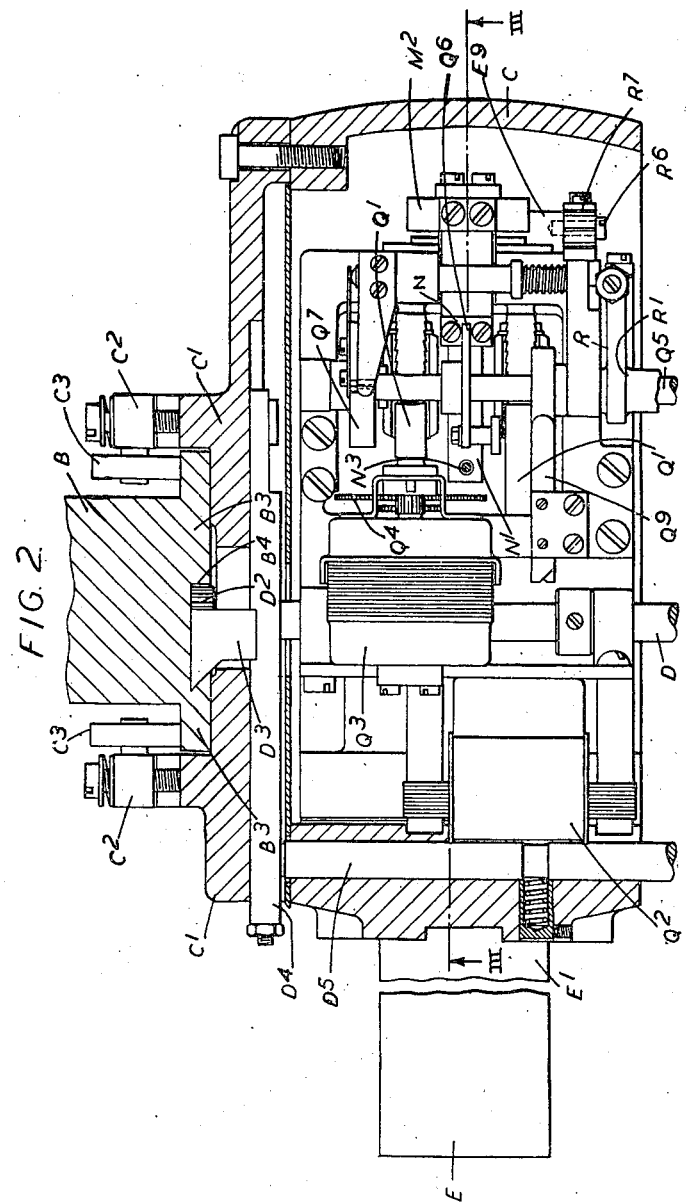
Figure 3:
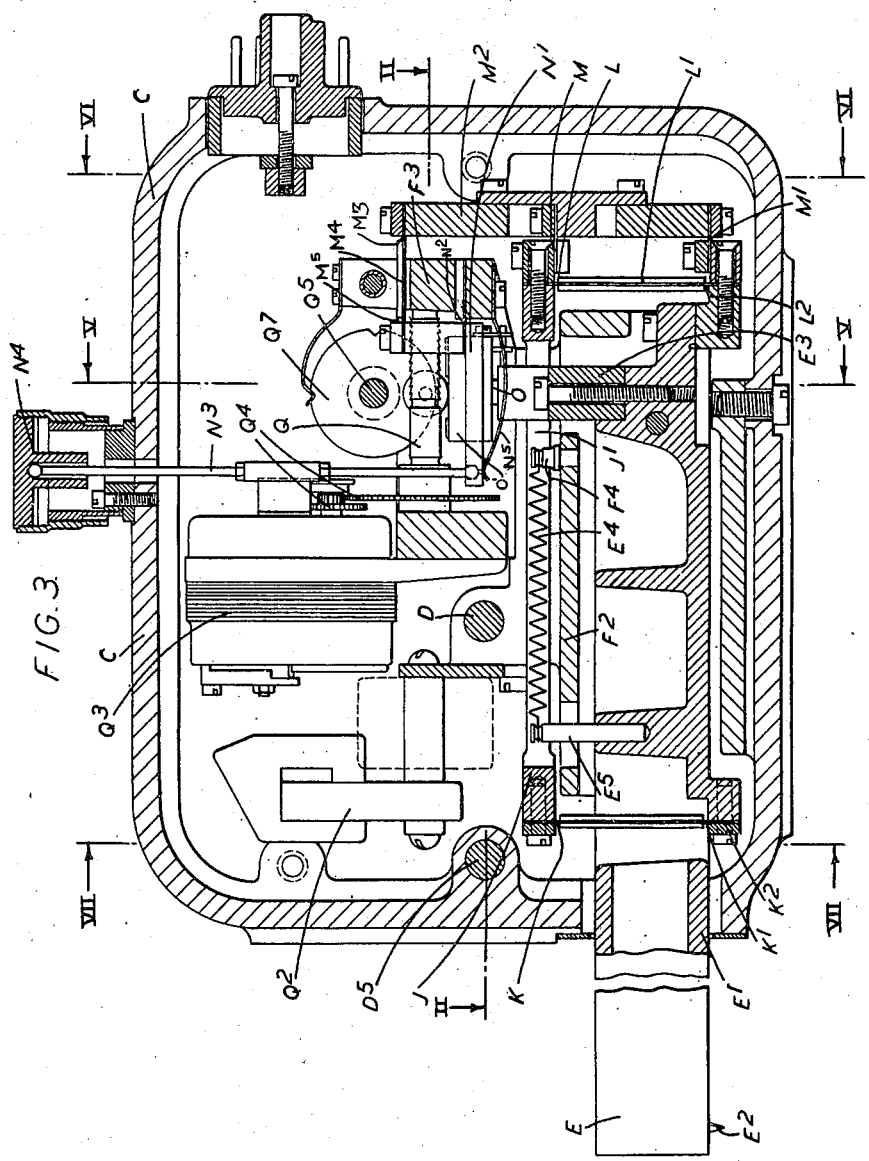
Figure 4:
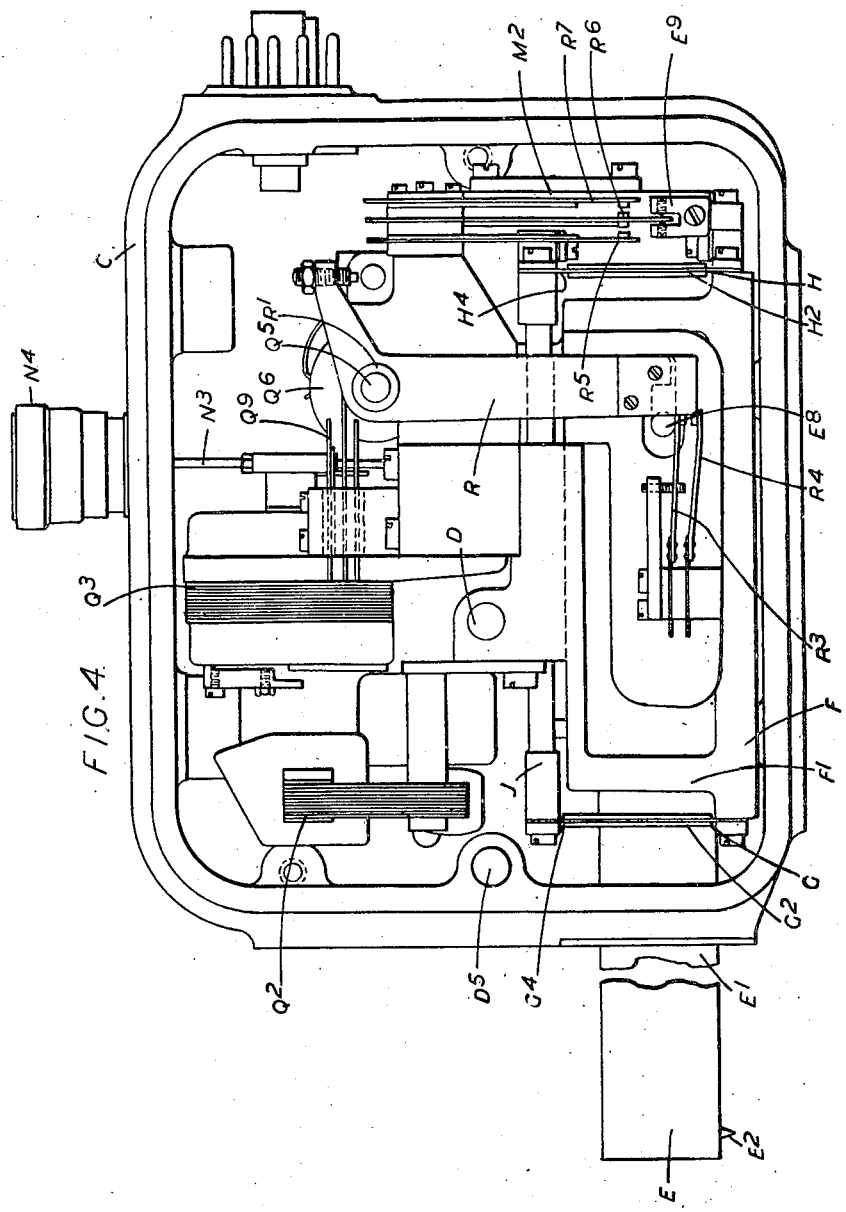
Figure 5:
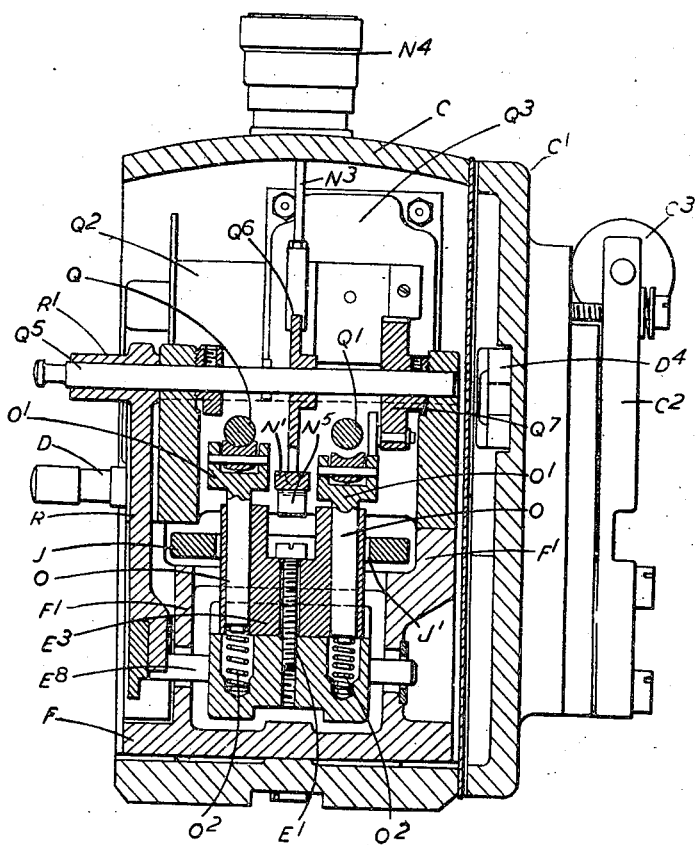
Figure 6:
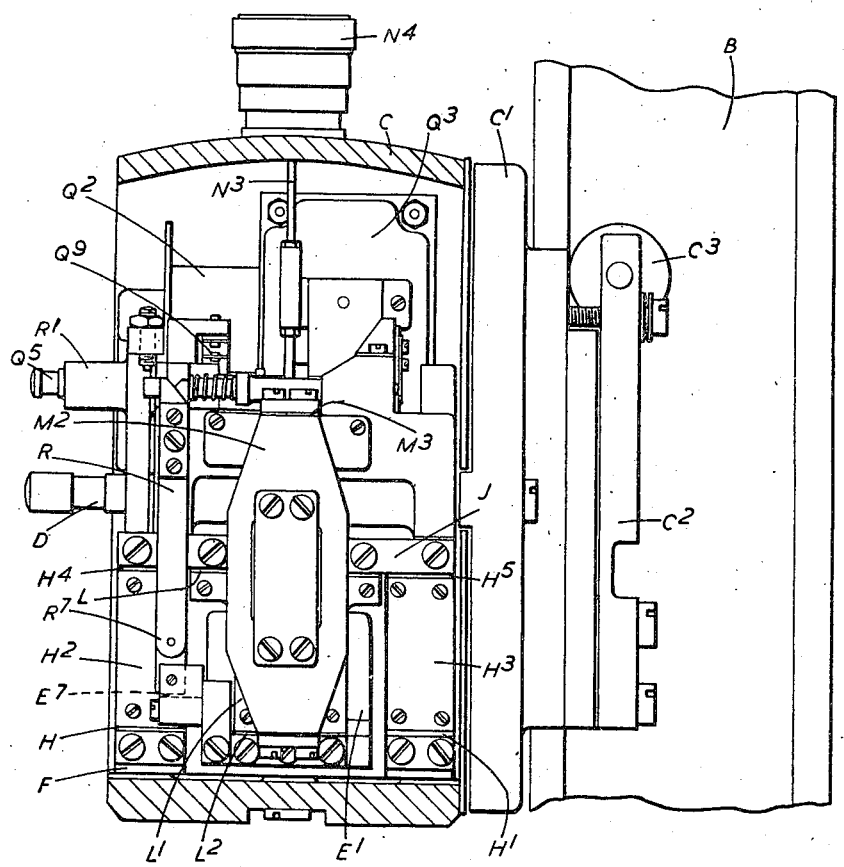

In these drawings:

Figure 1 is a general view from the side of one convenient arrangement of the complete apparatus for measuring surface roughness, incorporating the pick-up unit according to the invention, Figure 2 is a horizontal section on a larger scale of the pick-up unit the section being taken on the broken line II—II of Figure 3, Figure 3 is a vertical section on the line III—III of Figure 2, Figure 4 is a side elevation of the pick-up unit with the cover plate of the casing removed, Figures 5 and 6 are transverse vertical sections taken respectively on the lines V—V and VI—VI of Figure 3 looking towards the left in that figure.

Figure 15:
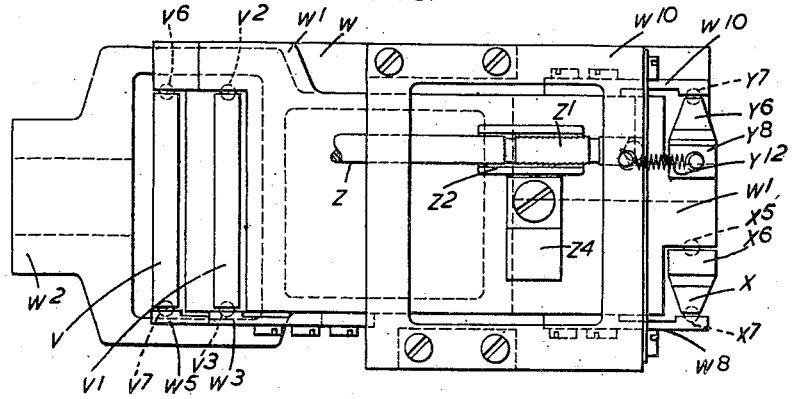
Figure 16:
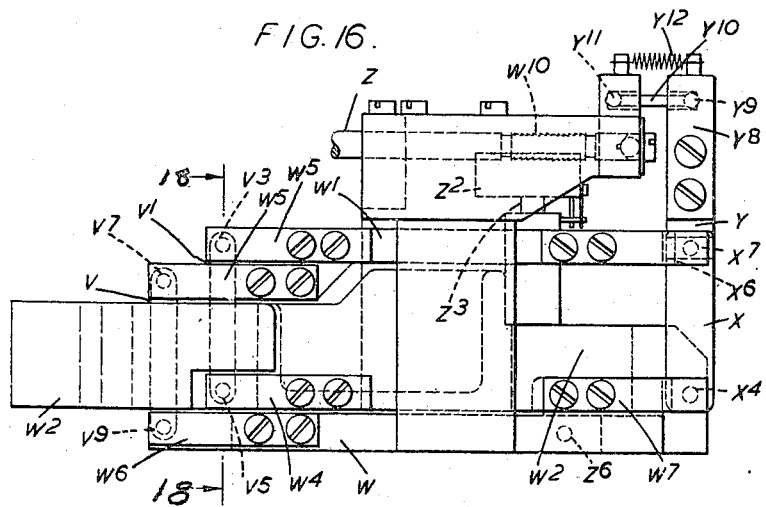

Figure 7 is a transverse vertical section taken on the line VII—VII of Figure 3 looking towards the right in that figure, Figures 8 to 10 are respectively a vertical section, a horizontal section and an end elevation (viewed from the right of Figure 3) on a larger scale of a part of the construction shown in Figures 2 to 7, Figures 11 to 13 shown diagrammatically three alternative forms of double linkage, which can be employed in place of the double Scott-Russell linkage used in the construction of Figure 2-7, Figures 14a, 14b, 14c, 14d and 14e are diagrams similar to those of Figures 11–13, but showing the double Scott-Russell linkage in its elementary form and in developments of such form, Figure 14e being a diagrammatic representation of the form actually employed in the construction of Figures 2 to 7, and Figures 15 to 19 respectively show a plan view, a side elevation, a view from below, a transverse section on the line XVIII—XVII of Figure 16, and an end elevation viewed from the right of Figures 15 to 17, of an alternative practical construction.

The surface-roughness measuring apparatus shown in Figure 1 comprises a main support in the form of a wheeled trolley A, provided with means indicated at $A^1$ for steadying the apparatus on the floor when in use. This trolley carries a work table $A^2$ for supporting (in any desired position thereon) the specimen whose surface is to be examined, and also a vertical column B, in the form of a generally H-shaped girder, on which the casing C of the pick-up unit is adjustably mounted. The trolley A also carries a further casing $A^3$, which houses the pen recorder or other device for giving the desired indication of the surface roughness, whilst the electrical parts of the apparatus are carried in racks $A^4$ on the trolley.

The vertical column B also carries a counterweight $B^1$ connected to the casing C of the pick-up unit by a cable passing over a pulley $B^2$ at the top of the column. The casing C has a side plate $C^1$ (see also Figures 2 to 7, especially Figures 2, 6 and 7) which can slide up and down the face of the column B and has clamped to it at the sides of the column brackets $C^2$ carrying rollers $C^3$ which engage with the inner faces of the flanges $B^3$ of the column B. Vertical movement of the casing C on the column is controlled by a hand knob $D^1$ on the end of a shaft D passing through the casing C, this shaft carrying a pinion $D^2$ engaging with a rack $B^4$ fitted to the column. The casing C can be locked in any chosen position of adjustment on the column B by means of a wedge-member $D^3$ carried by a bar $D^4$ which can slide through the side plate $C^1$, this bar $D^4$ being moved longitudinally into or out of the locking position by means of a locking shaft $D^5$ actuated by a locking handle $D^6$ adjacent to the hand-knob $D^1$ on the other side of the casing.

The pick-up head E is mounted on the end of a horizontal channel-shaped bar $E^1$ which projects freely through an opening near the bottom of the side wall of the casing C and is movable longitudinally, the bar $E^1$ and the pick-up head E being movable together relatively to the casing for traversing the sylus $E^2$.

The channel-shaped bar $E^1$ is supported in the casing C by link mechanism, which consists in essence of two identical Scott-Russell linkages so disposed that the line joining any pair of corresponding points of the two linkages lies parallel to the line joining the two tracing points, at which the bar is pivoted to the linkages. It will be convenient at this stage to describe the linkages first of all with reference to the diagrams of Figures 14a to e, in which Figure 14a shows an arrangement employing two complete Scott-Russell linkages in their simplest form and Figures 14b, 14c and 14d show developments thereof leading up to Figure 14e which illustrates the arrangement employed in the construction of Figures 2 to 7.

Referring first to Figure 14a, each of the two Scott-Russell linkages consists of two links, of which the first $a$ or $b$ is twice the length of the second $a^1$ or $b^1$. One end $a^2$ or $b^2$ of the first link constitutes the tracing point, whilst the other end $a^3$ or $b^3$ carries a roller $a^4$ or $b^4$ which engages with a fixed straight guide $a^5$ or $b^5$. The second link $a^1$ or $b^1$ is pivoted at one end of the mid-point $a^6$ or $b^6$ of the first link and at its other end to a fixed point $a^7$ or $b^7$ collinear with the fixed guide $a^5$ or $b^5$, or more strictly with the straight path of the guided end point $a^3$ or $b^3$ of the first link. It will be clear that each tracing point $a^2$ or $b^2$ generates a straight line through the fixed pivot $a^7$ or $b^7$ at right angles to the length of the guide $a^5$ or $b^5$. The controlled member $e$ (which represents the traversing bar $E_1$ of Figures 2 to 7) is pivoted to the double linkage at the two tracing points $a^2$ and $b^2$, and extends in a direction parallel to the line joining the two tracing points, which are separated by a distance equal to that between the two fixed pivots $a^7$ and $b^7$, and also to that between the two fixed guides $a^5$ and $b^5$, so that the controlled member $e$ moves in the direction of its own length.

Figure 14b shows a modification of this arrangement, in which an additional link $d$ connects the mid-points $a^6$ and $b^6$ of the two first links, the length of the link $d$ being equal to the distance between the fixed pivots $a^7$ and $b^7$. A single fixed guide $b^5$ is employed for the two linkages, the upper half of the first link $a$, rendered redundant by the additional link $d$, being omitted.

In the further development shown in Figure 14c, the upper halves of the first links $a$ and $b$ of both linkages are omitted, the additional link $d$ being extended to pivot at the mid-point $d^1$ of a control link $d^2$, one end $d^3$ of which engages through a roller with a fixed straight guide $d^4$, whilst the other end $d^5$ is so pivoted to the controlled member $e$ that the control link $d^2$ always lies parallel to the first links $a$ and $b$ of the two linkages. It will be clear that, with this arrangement, the control link $d^2$ ensures that the additional link $d$ always moves at exactly half the speed of the controlled member $e$.

The accuracy of the straight-line path generated by the tracing point of a Scott-Russell linkage will theoretically depend on the accuracy of the fixed straight guide, but in the portion of the path close to the fixed pivot, when the angle between the two links is very small, the degree of accuracy will be very high even if there are quite material errors in the straightness of the guide. This being so, it will be clear that only a negligibly small error will be introduced (in the portion of the path close to the fixed pivot) if the upper end of the first link is constrained to move over a circular path of large radius approximating to the usual fixed straight guide. Such a modification is shown in Figure 14d, wherein the end $d^3$ of the control link $d^2$ is pivoted to the end of a further link $d^6$ of adequate length, lying approximately parallel to the direction of movement of the controlled member $e$ and pivoted at its remote end to a fixed point $d^7$. It is convenient in practice to duplicate some of the links so as to enable the various elements to pass one another without fouling and thus to permit the most accurate portion of the trace near the fixed pivot to be employed. It will thus be seen that the link $d^6$ and connecting parts in effect form a guide which controls the angular relationship between the links $b$, $b'$ throughout all angular positions of the link $b'$ about its pivotal point on the casing.

Adjustment of the angle between the direction of movement of the two tracing points and the line joining them, can readily be effected by adjusting the position of the fixed pivot $d^7$. Theoretically, such adjustment should take place about the fixed pivot $d^5$, but in practice the error involved in effecting the adjustment about a pivot $d^8$ (see Figure 14e) located in a convenient position between the pivots $d^5$ and $d^7$ is negligibly small. As has been mentioned, it is the arrangement of Figure 14e, which is actually used in the preferred construction of Figures 2 to 7, though any of the other modifications just described could have been employed, if desired.

Thus in the preferred practical construction the complete link mechanism comprises a horizontal base plate F, which is secured to the base of the casing C and to which are clamped at the four corners of a rectangle four flat spring ligaments $GG^1HH^1$ each of which constitutes a fixed pivot for an upwardly projecting arm $G^2$ or $G^3$ or $H^2$ or $H^3$, the two front arms $G^2$ and $G^3$ thus pivoting about a fixed axis constituted by one side of the rectangle and together making up the second link of one linkage, whilst the two rear arms $H^2H^3$ similarly pivot about a parallel fixed axis constituted by the opposite side of the rectangle and together make up the second link of the other linkage. Each of these four arms $G^2G^3H^2H^3$ carries a ligament spring at its upper end, and the four ligament springs $G^4G^5H^4H^5$ are clamped to a horizontal plate J (constituting the additional link) at the four corners of a rectangle similar to that on the base plate F.

Between the front pair of ligament hinges $G^4G^5$ the horizontal plate J carries a downwardly projecting ligament spring K constituting a pivot for another arm $K^1$ of the same length as the four arm $G^2G^3H^2H^3$ already mentioned, and an exactly similar arm $L^1$ is provided between the rear pair of ligament hinges $H^4H^5$. These two arms $K^1L^1$ constitute the first links of the two linkages, or more strictly the lower halves of the first links, the upper halves being omitted. At their lower ends these two arms $K^1L^1$ carry further ligament springs $K^2L^2$, which are clamped to the controlled bar $E^1$, the spacings between the front and rear ligament hinges being the same on the base F, on the horizontal plate J and on the controlled bar $E^1$, so that in their normal rest positions all the front ligament hinges $$GG^1G^4G^5KK^2$$

lie in the same vertical plane, as also do all the rear ligament hinges $HH^1H^4H^5LL^2$. The base plate F and the controlled channel-shaped bar $E^1$ are suitably recessed to provide clearance for the movement of the bar. Although separate ligament hinges have been referred to at the top and bottom of each vertical arm, it will usually be satisfactory in practice to employ a continuous ligament for the two hinges, the main part of such ligament between the two pivots being clamped between rigid plates to form the arm itself.

The fixed base plate F forms part of a shaped supporting framework within the main casing, this framework including recessed vertical side walls $F^1$ and a slotted horizontal wall $F^2$ extending between the side walls above the controlled channel-shaped bar $E^1$ and below the horizontal plate J (as well as various brackets for supporting parts of the driving mechanism to be described later), the controlled bar $E^1$ thus moving longitudinally within a skeleton rectangular tubular structure.

The horizontal plate J and the controlled bar $E^1$ each extend back beyond the rear linkage for the same distance and carry at their rear ends horizontal flat spring ligament hinges $MM^1$ constituting respectively a mid-point pivot and a bottom pivot for the vertical control link $M^2$, whose upper end carries a further horizontal ligament $M^3$ constituting a pivot between the control link and the guiding link $M^4$, which extends forward in a generally horizontal direction above the horizontal plate J. The front end of the guiding link $M^4$ is pivoted by a ligament spring $M^5$ to a block N, the bottom of which is attached to an intermediate part of a further generally horizontal link $N^1$ pivoted on a ligament hinge $N^2$ at its rear end to a fixed bracket $F^3$ on the base framework. The front end of this further link $N^1$ normally remains fixed during operation of the mechanism, but can be vertically adjusted about its pivot $N^2$ through a small range by means of a threaded adjusting rod $N^3$ extending through the top wall of the casing C to an adjustable hand knob $N^4$, a leaf spring $N^5$ being provided to keep the link $N^1$ in engagement with the rod $N^3$. Thus by operating the head knob $N^4$ the further link $N^1$ will move about its fixed pivot $N^2$ at its rear end and will thus cause the guiding link $M^4$ to move about the same pivot, thereby adjusting the upper end of the control link $M^2$ forwards or backwards through a short distance. This will have the effect of varying the direction of movement of the two tracing points.

That this is so, will be clear from a consideration of the equivalent linkage arrangement employing a straight guide. Theoretically, in such equivalent arrangement, the straight guide should be angularly adjustable about the basic fixed pivot with which it is collinear, and in such case the direction of movement of the tracing points would be at right angles to the guide in all angular positions of the guide. In practice, provided the angular adjustment is limited to a small angle, the error involved in locating the adjustment pivot for the guiding link at a considerable distance away from the said basic fixed pivot, is negligibly small.

The variability of the direction of movement of the controlled bar $E^1$ through a small angle or either side of the normal direction, which is coincident with the direction of the length of the bar, is especially advantageous in constituting a fine adjustment for enabling the direction of traversing of the stylus $E^2$ to be accurately coordinated with the surface under investigation. In practice, this is conveniently achieved, after coarse adjustment, by bringing the link mechanism into its normal zero position, wherein the links all lie vertically, and then by a preliminary adjustment bringing the indicating element to a convenient point on the scale when the stylus is engaging the surface in this position, for example in the case of a pen recorder by bringing the pen somewhere near the middle of the paper. The stylus $E^2$ is then moved along the surface by operation of the driving mechanism to be described below, and if the direction of traversing is not accurately parallel to the surface, the pen will move off the paper after a short traverse (owing to the high magnification employed). The adjusting knob $N^4$ is then operated in the appropriate direction to tilt the control link $M^2$ through the small angle necessary to bring the pen back on to the paper in the new position, so that the general direction of the trace after such adjustment will be approximately the same as the length of the paper record.

The mechanism for driving the controlled bar $E^1$ for traversing the stylus may vary, but the drawings show by way of example one convenient practical arrangement whereby the bar can be driven in the forward traversing direction at one or other of two speeds—a relatively slow speed for operation of, say, a pen recorder and a relatively high speed for operation of an integrating meter for giving a reading of the "average" roughness of the surface—and can be quickly reset to its starting position in readiness for a further forward traverse.

In this arrangement the controlled bar $E^1$ carries a block $E^3$ which projects upwardly through the slot $J^1$ in the horizontal plate $J$; this slot also serving to house a tension spring $E^4$ anchored between two vertical posts $E^5$ and $F^4$ carried respectively by the controlled bar $E^1$ and the fixed horizontal wall $F^2$, this spring $E^4$ thus tending to move the block $E^3$ towards the right in the view shown in Figure 3.

Two vertical rods $O$ are mounted to slide vertically in the block $E^3$ and each carries at its upper end a cradle $O^1$ of channel section, the rod being pressed upwardly by a spring $O^2$ and being held against rotation by a pin $E^6$ extending horizontally from the block $E^3$ into a short vertical slot $O^3$ in a bracket $O^4$ carried by the cradle $O^1$. The slot $O^3$ also acts as a stop to limit the upward movement of the cradle under the action of the spring $O^2$. These parts are shown on a larger scale in Figures 8 to 10. This pin $E^6$ together with another shorter pin $E^7$ slightly spaced from it and likewise carried by the block $E^3$ also serves as a guide for a pin $P^1$ depending downwardly through a slot in the cradle $O^1$ from a half-nut $P$ carried in the cradle. The two half-nuts $P$ engage respectively with two screwthreaded shafts $QQ^1$ mounted horizontally in bearings carried by a bracket $F^3$ on the fixed framework and extending parallel to one another in the direction of traversing.

Each half-nut $P$ fits freely in its cradle $O^1$ and rests on a leaf spring $O^5$ in the base of the cradle urging it upwardly into engagement with the screwthreaded shaft $Q$ or $Q^1$. The half-nut extends for the full length of the cradle but only a small portion at one end is threaded to engage with the shaft, whilst a smooth portion $P^2$ at its other end acts as an abutment resting against the threads on the shaft, the middle portion being cut away clear of the shaft. This middle portion and the end abutment piece are slotted longitudinally at $P^3$ along the centre line to provide accommodation for a horizontal link $P^4$ pivoted at $P^5$ to the middle of the half-nut and extending to the end thereof, where the link is pivoted at $P^6$ to the cradle $O^1$. The latter pivot pin $P^6$ passes freely through a hole in the half-nut $P$, and the former pivot pin $P^5$ likewise passes freely through a hole in the cradle $O^1$, and the two pins in these larger holes act as stops to limit the movement of the half-nut in the cradle.

It will be clear that with this arrangement the half-nut is free to move vertically within the small limits defined by the stops and can tilt slightly in such vertical movement, owing to the provision of the horizontal pivoted link $P^4$, but its horizontal driving movement is transmitted without free play through the link $P^4$ to the cradle $O^1$ and thence through the vertical rod $O$ to the controlled bar $E^1$ of the linkage.

One of the two shafts $Q$ is operative for a relatively slow speed traverse suitable for use with a pen recorder, and the other $Q^1$ for a higher speed traverse suitable for obtaining an average measurement, and a hand-operated change-over device is provided to select which drive shall be operative. The two shafts $QQ^1$ are driven respectively from two small electric motors $Q^2Q^3$ through suitable gearing $Q^4$ at the appropriate speeds. The change-over device may consist of a transverse spindle $Q^5$ mounted above the two shafts and carrying a pair of cam discs $Q^6Q^7$ (or the equivalent) acting respectively on parts of the two cradles $O^1$ which carry the half-nuts. Thus in one operative position of the spindle $Q^5$ one of the half-nuts will be held down out of engagement with its screwthread, whilst in the second operative position of the spindle the other half-nut will be held out of engagement with its screwthread. The change-over spindle is operated by a hand knob $Q^8$ projecting from the side of the casing $C$. The spindle is also utilised to operate contacts $Q^9$ controlling the motor circuits so that the appropriate motor $Q^2$ or $Q^3$ is energised when the corresponding half-nut is in engagement with its shaft $Q$ or $Q^1$.

The two screwthreaded shafts are each provided with asymmetrical teeth, after the manner of a ratchet, so that the half-nuts P can slide freely over the threads in one direction to facilitate quick resetting to the starting position, the traversing drive being effective in each case in the forward direction only. This arrangement also has the advantage that, should anything act to interfere with the movement of the controlled channel-shaped bar $E^1$ during the traversing drive, the thread will ratchet idly without damage to the parts.

To effect starting and resetting a lever R is provided which is carried by a hollow transverse spindle $R^1$ which surrounds the spindle $Q^5$ and projects through the wall of the casing C to an actuating hand lever $R^2$. This lever R near its lower end abuts against a stud $E^8$ projecting laterally from the controlled bar, so that movement of the starting lever R in one direction from its normal position will push the controlled bar $E^1$ back to the starting position ready for a new traverse. The starting lever R (in conjunction with the stud $E^8$ on the controlled bar) also operates contacts in the motor circuits, the arrangement being such that the appropriate motor starts up to effect the traverse when the starting lever is moved back to its normal position after resetting the controlled bar.

For this purpose the starting contacts conveniently consist of an upper spring blade contact $R^3$ and a lower spring blade contact $R^4$, the starting lever R being so shaped that, when in its resetting position, it depresses both spring blades and holds the contacts open. The stud E on the controlled bar also engages with the upper spring blade $R^3$, but does not effect the lower spring blade $R^4$. Thus in the resetting position, the starting lever holds both blades $R^3$ and $R^4$ depressed, with the contacts open. When the starting lever is moved back to its normal position, leaving the controlled bar $E^1$ and its stud $E^8$ in the resetting position, it releases both contacts by moving off their ends, but only the lower blade $R^4$ moves, since the upper blade remains depressed by the stud. The contacts therefore close when the starting lever gets back to the normal position, and complete the circuit to the appropriate motor, as determined by the position of the clutch spindle $Q^5$. The motor therefore starts up and effects the traverse, during which the stud $E^8$ moves along the upper spring blade $R^3$ and finally comes off the end thereof, after a predetermined length of traverse, to release the upper blade and thereby open the contacts and stop the motor. In the resetting movement the starting lever R depresses the two blades $R^3R^4$ simultaneously so that the contacts remain open throughout the resetting movement and do not close until the starting lever has returned to its normal position.

The controlled bar $E^1$ also serves to operate further contacts associated with the circuit of the integrating meter used for the average measurement, in order to ensure that such meter only comes into operation after an initial short portion of the traversing movement sufficient to ensure that the motor $Q^2$ has reached its full speed and likewise goes out of operation before the final portion of the traversing movement during which the motor is coming to rest before stopping. These contacts consist of three vertical spring blades $R^5R^6R^7$ clamped at their upper ends and extending down behind the rear end of the horizontal plate J. The two outer spring blades $R^5R^7$ are electrically connected together and both co-operate with the middle blade $R^6$, which extends further down between jaws $E^9$ carried by the controlled bar $E^1$. In the resetting position at the beginning of a traverse, the middle blade $R^6$ is moved by the jaws $E^9$ on the controlled bar $E^1$ into engagement with the front spring blade $R^5$, and the contacts are therefore closed. After the appropriate short initial portion of the traverse the middle blade $R^6$ is moved out of engagement with the front blade $R^5$ and thus opens the contacts. The contacts remain open until shortly before the end of the traverse when the middle blade $R^6$ is brought into engagement with the rear blade $R^7$ to close the contacts.

The arrangement of the electromagnetic device in the pick-up head controlled by the movements of the stylus approximately normal to the surface and of the measuring apparatus controlled thereby, forms no part of the present invention, but may be for instance as described in the United States of America patent specification application Serial No. 378,836, filed February 13, 1941, now Patent No. 2,344,217 in the name of the present applicant and another.

The foregoing arrangement may be modified in various ways, for example by employing other forms of double straight-line linkage. Thus one alternative form of double linkage which may be used consists of two identical linkages of the Watt type, as shown diagrammatically in Figure 11, so disposed that lines joining corresponding points of the two linkages all lie parallel to the line joining the two tracing points, at which the controlled bar is pivoted to the linkages. In each linkage, the tracing point lies at the mid-point S of a normally horizontal link $S^1$ (the drawing showing the parts moved away from their normal central positions). The front end $S^2$ of this link $S^1$ is pivoted to the lower end of a normally vertical link $S^3$ and its rear end $S^4$ is pivoted to the upper end of a normally vertical link $S^5$. The two vertical links $S^3S^5$, which are of equal lengths, are pivoted at their other ends to fixed points $S^6S^7$ respectively. The controlled bar $S^8$ is pivoted to the linkages at the two tracing points S, and the spacing between these two pivots is equal to the spacings between the two upper fixed pivots $S^6$ and also to that between the two lower pivots $S^7$. It is not essential that the two vertical links in each linkage should be of equal length, but if they are unequal the tracing point should divide the horizontal link in the same ratio as that between the vertical links and should be nearer to the longer link. The Watt linkage gives only an approximation to a straight line, but the error from the true straight line is very small within a moderate range of movement of the tracing point from the normal central position.

Another alternative form of double linkage is a double inverted Watt linkage, as shown diagrammatically in Figure 12, again with the lines joining corresponding points of the two inverted Watt linkages all lying parallel to the line joining the two tracing points. The inverted Watt linkage differs from the Watt linkage, in that the two vertical links $S^3S^5$ are unequal in length and both lie on the same side of the horizontal link $S^1$, and that the tracing point S lies on an extension of the horizontal link beyond the pivotal connection $S^2$ to the longer vertical link $S^3$, the ratio between the distance of the tracing point S to the two pivots $S^2$ and $S^4$ being equal to the ratio between the lengths of the two vertical links.

Such alternative double linkages may be modified by providing additional links parallel to the direction of movement of the controlled bar and omitting redundant links, in the manner described above. It is also convenient in practice to duplicate some of the links in a manner analogous to that employed in the construction of Figures 2 to 7, in order to permit the various elements to move past one another without fouling; and flat spring ligaments are preferably employed for the pivots.

Adjustment of the angle between the direction of movement of the two tracing points and the line joining them can readily be effected by deforming the parallelogram formed by the four normally fixed pivots, and Figure 13 shows a modification of Figure 11 permitting such adjustment. In this modification the two pairs of normally fixed pivots $S^6S^6$ and $S^7S^7$ are mounted respectively on two additional lines T and $T^1$ lying parallel to the controlled bar $S^8$ and interconnected by a pair of normally fixed parallel control links $T^2T^3$ so as to be constrained to remain parallel to one another.

The desired angular adjustment can be effected by so mounting the normally fixed control links $T^2T^3$ that they can be rocked through an appropriate angle about fixed pivots $T^4T^5$ at corresponding points of the links and can be clamped in any desired angular position.

Although it will usually be preferred to employ ligament hinges for the various pivots in the foregoing arrangements, owing to their freedom from errors due to dirt and frictional wear and also to "shake" in the joints, satisfactory results can be obtained by means of ball and socket joints, wherein the balls are pressed into engagement with the sockets by clamping pressure exerted in the direction of the pivot axis, since such an arrangement is self-aligning and eliminates errors due to shake.

One such practical construction (employing a simplified form of the double Scott-Russell linkage used in the construction of Figures 2 to 7) is illustrated by way of example in Figures 15 to 19. In this construction the two links of the front linkage are in the form of plates $VV^1$ disposed one behind the other, the plate V serving to connect the fixed base W with the horizontal plate $W^1$; whilst the other plate $V^1$ connects the horizontal plate $W^1$ with the controlled bar $W^2$. The mounting of the plate $V^1$ is shown in detail in Figure 18.

Thus the plate $V^1$ is conically or otherwise recessed in its side edges to provide sockets for four balls $V^2V^3V^4V^5$. The upper ball $V^2$ on one side also engages in a recess formed in the body portion of the horizontal plate $W^1$. The upper ball $V^3$ on the other side likewise engages in a recess in a spring strip $W^3$ clamped to the side of the horizontal plate $W^1$, the spring pressure acting in the direction of the line joining the two balls $V^2V^3$, thus providing a self aligning hinge free from shake. The lower balls $V^4V^5$ similarly engage in recesses in the body of the controlled bar $W^2$ and in a spring strip $W^4$ clamped to such bar.

The front plate V also has recesses for four balls $V^6V^7V^8V^9$, of which the upper two $V^6V^7$ engage in recesses in the body of the horizontal plate $W^1$ and in a spring strip $W^5$ clamped to such plate, whilst the lower two $V^8V^9$ similarly engage in recesses in the body of the fixed base W and in a spring strip $W^6$ clamped to the base.

At its rear end the horizontal plate $W^1$ is connected to the base W through a link X and to the controlled bar $W^2$ through a link Y, which also extends upwardly above the horizontal plate.

At its lower end the link X has recesses for two balls $X^1X^2$, of which the first $X^1$ also engages in a recess in a portion of the base W whilst the second $X^2$ is mounted on the end of a short distance piece $X^3$ whose other end is also formed as a ball $X^4$ to engage in a recess in a spring strip $W^7$ clamped to the base W. At its upper end the link X has on one side a recess for a ball $X^5$ engaging in a recess in the body of the horizontal plate $W^1$, whilst on the other side the link is provided with a horizontal groove to receive the flattened end of a hatchet-shaped distance piece $X^6$ whose other end is formed as a ball $X^7$ engaging in a recess in a spring strip $W^8$ clamped to the horizontal plate $W^1$.

At its lower end the link Y has recessed four balls $Y^1Y^2$ of which the first $Y^1$ engages in a recess in the controlled bar $W^2$ and the second $Y^2$ is formed on the end of a distance piece $Y^3$ having at its other end a ball $Y^4$ engaging in a recess in a spring strip $W^9$ clamped to the controlled bar $W^2$. At its mid-point the link Y has on one side a recess for a ball $Y^5$ engaging in a recess in the horizontal plate $W^1$ and on the other side a groove for receiving the flattened end of a hatchet-shaped distance piece $Y^6$ having a ball $Y^7$ at its other end engaging in a recess in a spring strip $W^{10}$ clamped to the horizontal plate $W^1$. At its upper end the link Y carries a block $Y^8$ having a recess for receiving the ball-shaped end $Y^9$ of a link $Y^{10}$, whose other end is likewise formed as a ball $Y^{11}$ engaging in a recess in a bracket $W^{10}$ carried by the fixed base W. A tension spring $Y^{12}$ is provided to hold the link $Y^{10}$ in engagement in its recesses.

For driving the controlled bar $W^2$, an arrangement analogous to that employed in the construction of Figures 2 to 7 is used, but for simplicity the drawings indicate only a single driving shaft Z having ratchet teeth coacting with a half-nut $Z^1$ supported in a cradle $Z^2$ on a vertical post $Z^3$ slidable in a block $Z^4$ carried by the controlled bar $W^2$, a tension spring $Z^5$ connecting the controlled bar with a pin $Z^6$ on the fixed base W. The full details of this driving mechanism and of the operation of the whole arrangement will be apparent from the description already given in connection with the construction of Figures 2 to 7.

What we claim as our invention and desire to secure by Letters Patent is:

1. A pick-up unit for use in apparatus for measuring or indicating the roughnesses or undulations of a surface, comprising a casing, means whereby the casing can be located in any chosen position relatively to the surface under investigation, a stylus for engaging with the surface, a pick-up head carrying the stylus, a traversing member carrying the pick-up head, link mechanism constituting an interconnection between the casing and the traversing member and comprising a group of mutually pivoted links constituting in effect two straight-line linkages respectively constraining two points of the said member to perform substantially straight-line movements in the same direction, and driving means cooperating with the link mechanism to cause the traversing member and the pick-up head to be traversed over the surface along the straight-line path determined by the link mechanism.

2. A pick-up unit as claimed in claim 1, in which the link mechanism comprises two incomplete straight-line linkages, which are connected by the traversing member and by at least one additional link spaced apart from the traversing member and from fixed points of the linkages, the omitted parts of the two linkages being those which are rendered redundant by such interconnections whereby the link mechanism will operate as though the redundant parts had not been omitted.

3. The combination with the features claimed in claim 1, of means whereby the angle between the line joining the two points of the traversing member constrained by the linkages and the direction of movement of such points can be varied.

4. A pick-up unit as claimed in claim 1, in which the link mechanism comprises a group of links in effect constituting two straight-line linkages each having two pivot points which remain fixed during operational movement, the link mechanism being otherwise unconstrained within predetermined limits of movement.

5. A pick-up unit as claimed in claim 1, in which the link mechanism comprises a group of links in effect constituting two straight-line linkages each having three links of appropriately related lengths, of which the first carries the tracing point of the linkage constituting a supporting point for the traversing member, whilst the other two are each pivoted to the first link and also to a point which remains fixed during operational movement.

6. A pick-up unit as claimed in claim 1, in which the link mechanism comprises a group of links in effect constituting two straight-line linkages each having one pivot point which remains fixed during operational movement and one other point which is in effect guided to move along an approximately straight path.

7. A pick-up unit for use in apparatus for measuring or indicating the roughnesses or undulations of a surface, comprising a casing, means whereby the casing can be located in any chosen position relatively to the surface under investigation, a stylus for engaging with the surface, a pick-up head carrying the stylus, a traversing member carrying the pick-up head, link mechanism within the casing comprising a group of mutually pivoted links constituting in effect two straight-line linkages respectively constraining two points of the said member to perform at least approximately straight line movements in the same direction, and driving means cooperating with the link mechanism to cause the traversing member and the pick up head to be traversed over the surface along the straight line path determined by the link mechanism, each of the two linkages having two links, of which the first carries at one end the tracing point constituting a supporting point for the traversing member carrying the pick-up head and has its other end in effect guided to move along an approximate straight path, whilst the second has a length equal to half that of the first link and is pivoted at one end to the midpoint of the first link and at the other end to a fixed pivot approximately collinear with the path of the guided end of the first link.

8. A pick-up unit as claimed in claim 7, in which the interconnections between the two linkages include, in addition to the controlled member, at least one additional link connecting a pair of corresponding points of the two linkages spaced apart from the controlled member and from the fixed pivots of the linkages, and the guided end of at least one of the two first links is omitted, the guiding of such first links being brought about in effect by pivoting one point of the link mechanism to one end of a relatively long guiding link pivoted about a center at its other end.

9. The combination with the features claimed in claim 8, of means for adjusting the position of the center about which the relatively long guiding link is pivoted whereby the angle between the line joining the two pivot points of the traversing member and their direction of movement can be varied.

10. A pick-up unit for use in apparatus for measuring or indicating the roughnesses or undulations of a surface, comprising a casing, means whereby the casing can be located in any chosen position relatively to the surface under investigation, a stylus for engaging with the surface, a pick-up head carrying the stylus, a traversing member carrying the pick-up head, link mechanism within the casing comprising a group of mutually pivoted links constraining two points of the said member to perform substantially straight-line movements in the same direction, and driving means cooperating with the link mechanism to cause the traversing member and the pick-up head to be traversed over the surface along the straight-line path determined by the link mechanism, the link mechanism comprising in combination with the traversing member, two pairs of links of equal length, the first link of each pair being pivoted at one end to the traversing member whilst the second link of each pair is pivoted at one end to a fixed point, an additional link pivoted at one point to the other ends of the first and second links of one pair and at another point to the other ends of the first and second links of the other pair, the line joining the two pivot points of the additional link being equal and parallel to that joining the two pivot points of the traversing member and also that joining the two fixed pivots, and means for causing movement of the additional link to take place at half the speed of that of the traversing member whereby the two pivot points of the traversing member are constrained to move along approximately straight-line paths in the same direction within predetermined limits of movement.

11. A pick-up unit as claimed in claim 7, in which the link mechanism comprises two incomplete linkages each consisting of a pair of links pivoted together, the first link of each pair also being pivoted at a fixed point whilst the second link of each pair is also pivoted to the traversing member at the tracing point of the linkage, the distances of the junction pivots of the two pairs from the two fixed pivots and from the two tracing points all being equal to one another, an additional link connecting a pair of corresponding points of the two linkages spaced apart from the traversing member and from the fixed pivots of the linkages, and means for imposing a constraint on the link mechanism equivalent to the constraint which would be imposed thereon by providing a guided end to the second link of either pair at the same distance as the tracing point from the junction pivot on the other side thereof and guiding such guided end to move along an approximately straight path approximately collinear with the fixed pivot of the pair, such means comprising a relatively long guiding link pivoted about a center at one end so that its other end constitutes a guided point movable along an approximately straight path parallel to the path of the said guided end and a parallel-link connection between such guided point and the two pairs of links whereby the movements of the said guided point is in effect transferred to the said guided end.

12. The combination with the features claimed in claim 11, of means for adjusting the position of the center about which the relatively long guiding link is pivoted, whereby the angle between the line joining the two pivot points of the traversing member and their direction of movement can be varied.

13. A pick-up unit for use in apparatus for measuring the roughness of a surface, comprising a casing, means whereby the casing can be located in any chosen position relatively to the surface under investigation, a stylus for engaging the surface, a pick-up head carrying the stylus, a traversing member carrying the pick-up head, link mechanism constituting in effect two straight line linkages respectively constraining two points of said member to perform substantially straight-line movements in the same direction, said mechanism comprising two pairs of links the two links of each pair being pivotally connected together, two corresponding links of the pairs being pivoted to said member respectively at said points and the other link of each pair being pivotally connected to the casing, guiding means between one pair of links and the casing for controlling the angular relation between the links of said one pair throughout the entire movement of said other link of said one pair, and a link connecting the points of interconnection of the two links of each pair to maintain corresponding links of the two pairs parallel with one another.

RICHARD EDMUND REASON.
DONALD ROY BERRIDGE.

REFERENCES CITED

The following references are of record in the file of this patent:

UNITED STATES PATENTS

| Number | Name | Date |
|---|---|---|
| 893,068 | Gay | July 14, 1908 |
| 1,232,728 | Spicer | July 10, 1917 |
| 2,048,154 | Abbott et al. | July 21, 1936 |
| 2,123,374 | McGauchie | July 12, 1938 |
| 2,171,433 | Powers | Aug. 29, 1939 |
| 2,240,536 | Woxen | May 6, 1941 |

FOREIGN PATENTS

| Number | Country | Date |
|---|---|---|
| 487,710 | Great Britain | June 24, 1938 |
| 539,273 | Great Britain | Sept. 3, 1941 |